United States Patent [19]

Modavis et al.

[11] Patent Number: 5,647,040
[45] Date of Patent: Jul. 8, 1997

[54] TUNABLE OPTICAL COUPLER USING PHOTOSENSITIVE GLASS

[75] Inventors: Robert Adam Modavis, Painted Post; Thomas A. Cook, Corning, both of N.Y.

[73] Assignee: Corning Incorporated, Corning, N.Y.

[21] Appl. No.: 572,016

[22] Filed: Dec. 14, 1995

[51] Int. Cl.⁶ .................................. G02B 6/18
[52] U.S. Cl. .......................... 385/42; 385/123; 385/142; 385/144
[58] Field of Search ..................... 385/42, 126, 141, 385/142, 123, 12

[56] References Cited

U.S. PATENT DOCUMENTS

| | | | |
|---|---|---|---|
| 4,341,441 | 7/1982 | Lighty et al. | 385/141 |
| 4,474,427 | 10/1984 | Hill et al. | 385/126 |
| 4,599,098 | 7/1986 | Sarkar | 65/3.12 |
| 4,634,858 | 1/1987 | Gerdt et al. | 250/227 |
| 4,696,536 | 9/1987 | Albares et al. | 385/14 |
| 4,799,949 | 1/1989 | Keck et al. | 65/409 |
| 4,842,368 | 6/1989 | Darcie et al. | 385/126 |
| 4,934,774 | 6/1990 | Kalnitsky et al. | 385/130 |
| 4,944,244 | 7/1990 | Moisan et al. | 118/723 |
| 4,948,217 | 8/1990 | Keck et al. | 385/126 |
| 4,973,136 | 11/1990 | Braatz | 350/338 |
| 5,004,447 | 4/1991 | Soref | 385/16 |
| 5,011,251 | 4/1991 | Miller et al. | 385/126 |
| 5,035,916 | 7/1991 | Kalnitsky et al. | 427/38 |
| 5,045,680 | 9/1991 | Fan et al. | 250/213 A |
| 5,082,629 | 1/1992 | Burgess, Jr. et al. | 422/82.11 |
| 5,108,200 | 4/1992 | Nonaka et al. | 385/11 |
| 5,126,553 | 6/1992 | England et al. | 250/211 J |
| 5,136,669 | 8/1992 | Gerdt | 385/39 |
| 5,166,992 | 11/1992 | Cassidy et al. | 385/24 |
| 5,208,877 | 5/1993 | Murphy et al. | 385/12 |
| 5,237,576 | 8/1993 | DiGiovanni et al. | 372/6 |
| 5,305,403 | 4/1994 | Kashyap | 385/37 |
| 5,377,288 | 12/1994 | Kashyap et al. | 385/37 |
| 5,434,702 | 7/1995 | Byron | 359/341 |
| 5,444,803 | 8/1995 | Kim et al. | 385/28 |
| 5,457,760 | 10/1995 | Mizrahi | 385/37 |
| 5,488,620 | 1/1996 | Minden | 372/18 |
| 5,495,548 | 2/1996 | Bilodeau et al. | 385/123 |

*Primary Examiner*—Rodney B. Bovernick
*Assistant Examiner*—Ellen Eunjoo Kang
*Attorney, Agent, or Firm*—Edward F. Murphy

[57] ABSTRACT

An optical coupler 10 has two fibers 20, 30 that are adjacent each other in a coupling region 12. One of the fibers has a clad doped with a photosensitive glass, such as germania. The photosensitive glass is exposed to suitable radiation to alter the index of refraction of fiber and tune the coupler 10 to the selected coupling frequency.

10 Claims, 6 Drawing Sheets

TUNABLE OPTICAL COUPLER USING PHOTOSENSITIVE GLASS

This invention relates in general to couplers, and, in particular, to waveguide optical fiber couplers which are tunable using photosensitive glass.

BACKGROUND

Optical waveguide delta-beta couplers have at least two optical fibers that couple light at from one optical fiber into the other. Each fiber includes a core and a cladding. In a coupler the claddings of each fiber touch each other along a selected, coupling region. The coupling of light from one fiber into another is more efficient when the clads of the two fibers are closer together. Coupling also depends upon the relative sizes of the two cores and clads. So, it is known to have cores and clads of equal sizes as well as cores and clads of unequal size depending upon the wavelengths selected for coupling.

During the formation of a coupler, the core of the optical fiber is substantially reduced in size. Part of the formation requires necking down the size of two or more of the coupled optical fibers to a diameter about the size of one of the fibers. Methods for forming such a necked down coupler is shown and described in U.S. Pat. Nos. 4,799,949 and 5,011,251 issued to Corning, Inc.

There are known techniques for altering the index of refraction of a portion of the coupler. These techniques include stretching or bending the coupler, especially in the coupling region. It is known that stretching or bending a fiber will alter its index of refraction. So, a coupler can be made into an optical switch by applying mechanical force. Application of an electromagnetic field to the coupling region also alters the index of refraction. However, when the applied mechanical force or electromagnetic field is removed, the coupler returns to its original index of refraction.

Germania is a common dopant for increasing the index of refraction of the cores. It is normally not used in the cladding where the index of refraction is less than the index of the core. Germania is also a photosensitive glass and changes its index of refraction upon exposure to ultraviolet light. The latter property of germania is useful in Bragg gratings that use optical fiber with core regions treated with ultraviolet light. A Bragg grating has a wavelength selective core comprising alternate regions of different indexes of refraction spaced apart by half the desired filter wavelength (in the glass). The Bragg gratings do not couple light from one fiber to another, but rather filter one or more wavelengths of light.

It is very difficult to precisely manufacture couplers. The coupling of light between fibers depends upon numerous manufacturing variables, including the amounts of dopants in the cores, the sizes of the cores and cladding, the reductions of the relative sizes of the fibers during a neck down process, the length of the coupling region, etc. Couplers are precision devices which are useless if they do not accurately couple the selected wavelength of light from one fiber to the other. However, after the fiber is fabricated, the coupling cannot be permanently changed to correct for manufacturing defects. Accordingly, there is a long felt need for a coupler that can permanently correct manufacturing defects without reliance upon continuous external mechanical forces or applied electromagnetic fields.

SUMMARY

The invention provides a wavelength tunable optical coupler that is permanently alterable. The tunable optical coupler has at least two optical fibers. Each fiber has a core and a cladding. The fibers may have the same size core or different size cores. One of the fibers has its cladding doped with germania. Germania is present in the cladding of the fiber in the coupling region where the selected wavelength is coupled from one fiber to the other. The germania in the coupling region is exposed to ultraviolet light in order to further alter the index of refraction in the coupling region and thereby tune the fiber to the wavelength selected for coupling.

The invention provides for a wavelength tunable optical waveguide coupler that has two inputs and two outputs. The fibers may have cores of different diameters. The photosensitive dopant selected for one of the claddings is preferably germania but may be another photosensitive glass selected from the group consisting of $Ce^{3+}$, $Eu^+$, $Eu^{3+}$, $TiO_2$, and $Pr^{3+}$.

DETAILED DESCRIPTION

Figure 1:
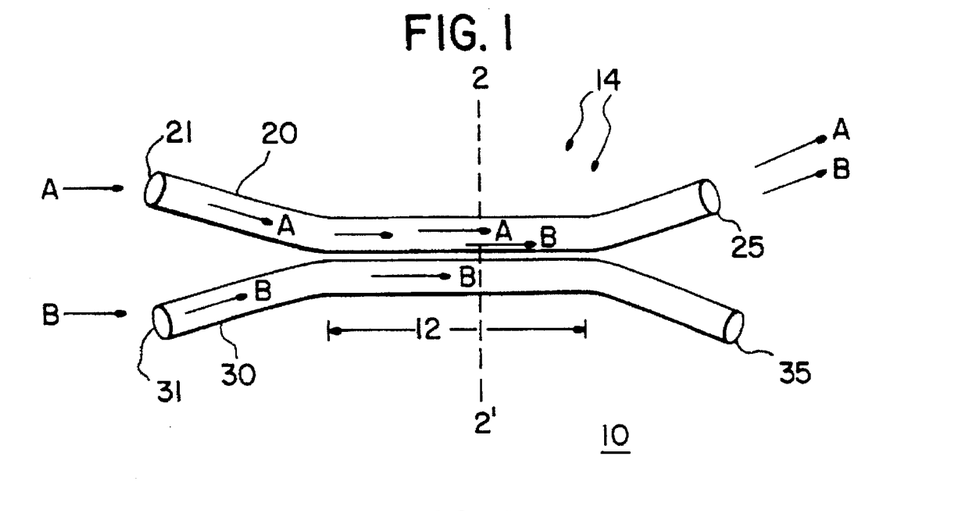
FIG. 1 is a partial schematic view of the tunable coupler.

Turning to FIG. 1, the coupler 10 comprises a first optical fiber 20 and a second optical fiber 30. The two fibers 20 and 30 are brought closely together over a coupling region 12. Light enters the coupler at input ports 21, 31, respectively, and exits at output ports 25 and 35, respectively. Light entering input port 21 has a first wavelength and is designated A; light entering input port 31 has a different wavelength designated B. The two wavelengths A, B travel to the coupling region 12 along the respective fibers. Upon entering the coupling region 12, light B is coupled from optical fiber 30 into optical fiber 20. Optical fiber 20 has a cladding that is doped with a photosensitive glass, such as germania. In manufacturing the coupler, care is taken to make sure that the relative diameter sizes of the optical fibers 20 and 30 and the length of the coupling region 12 are carefully made in order to achieve the maximum coupling of light of wavelength B from optical fiber 30 into optical fiber 20. However, because of the inconsistencies and variations in fabrication processes, it is not always possible to achieve the maximum coupling of light of wavelength B into fiber 20.

With the invention, the coupler 10 is fine tuned in order to increase the amount of wavelength B that is coupled into optical fiber 20. To achieve this result, optical fiber A has its cladding doped with germania or other suitable photosensitive glass. Once the actual amount of coupling of light B into fiber 20 is known, the coupling can be increased and fine tuned by exposing fiber 20, particularly in the coupling region 12, to suitable radiation. A fiber 20 with germania in the cladding is exposed to ultraviolet radiation 14. Such exposure of the photosensitive cladding to activating radiation alters the index of refraction of the cladding in optical fiber 20. This alteration of the index of refraction of the cladding of optical fiber 20 will increase the amount of light of wavelength B as coupled from optical fiber 30 into optical fiber 20.

Figure 2:
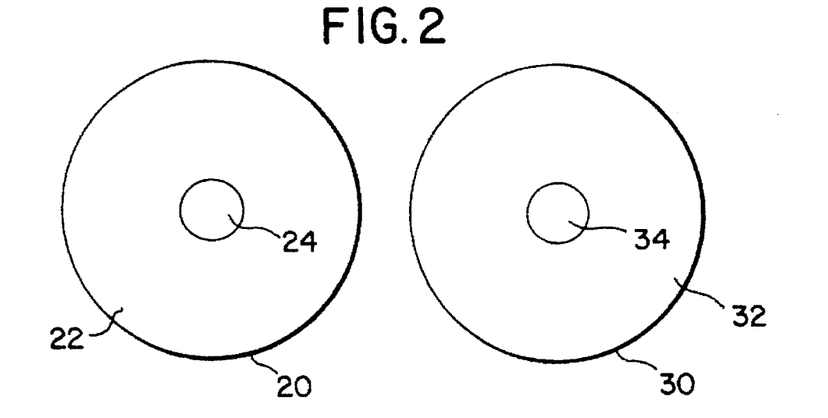
FIG. 2 is a cross-sectional view of the coupler taken along the line 2—2 prime of FIG. 1.

In one embodiment of the invention, the fibers have the same size core and cladding. This embodiment is shown in FIG. 2 where their respective cores 24 and 34 and claddings 22 and 32 are the same size. However, it is known that coupling can be enhanced by using fibers of different sizes.

Figure 3:
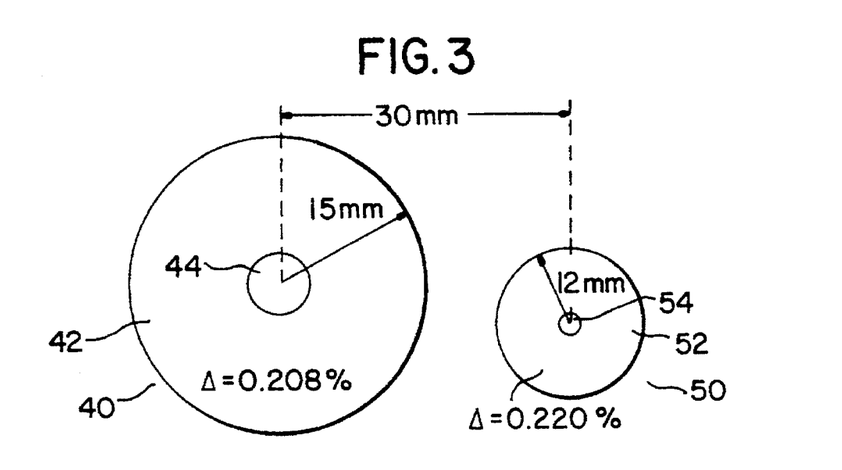
FIG. 3 is a partial cross-sectional view of a coupler having unequal cores and claddings.
Figure 4:
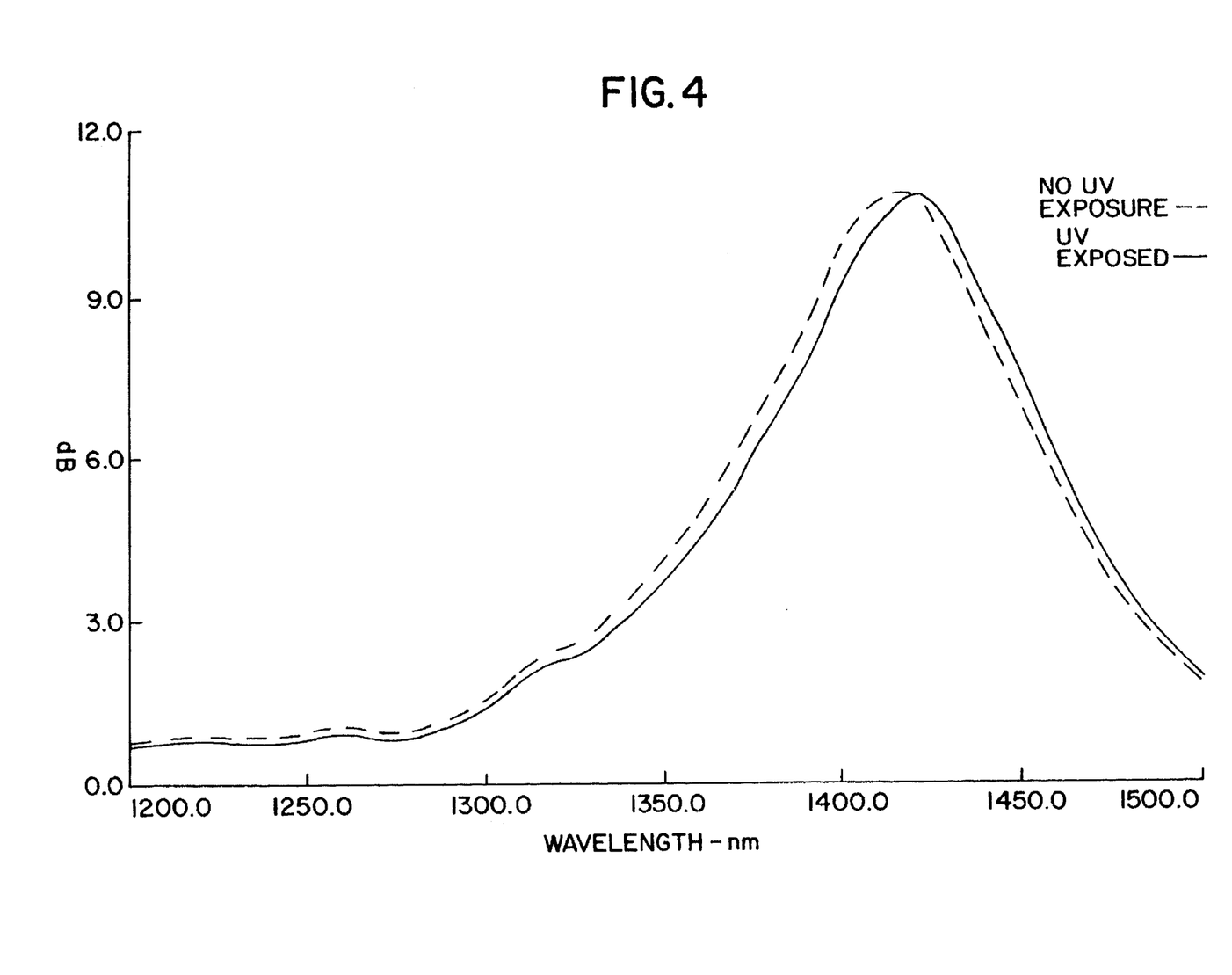
FIG. 4 is a graphical view of the shift in wavelength obtained by the coupler with the cores of FIG. 3.

With reference to FIG. 3, there is shown an example of the invention where the fibers are of different size. A fiber 40 has a radius of 15 μm and has a Δ equal to 0.208 percent. A second fiber 50 has a radius of 12 μm and a Δ equal to 0.220 percent. The two fibers are enclosed in a matrix glass and have their centers spaced apart 30 μm. When the fiber 50 is exposed to ultraviolet radiation, the index of refraction of fiber 50 can be as large as $1 \times 10^{-2}$ but can be $1 \times 10^{-5}$ or less to show the effect. The effects of this exposure to ultraviolet radiation are shown in FIG. 4. There one can clearly see that the tunable wavelength has shifted by approximately 5 nm.

Figure 5:
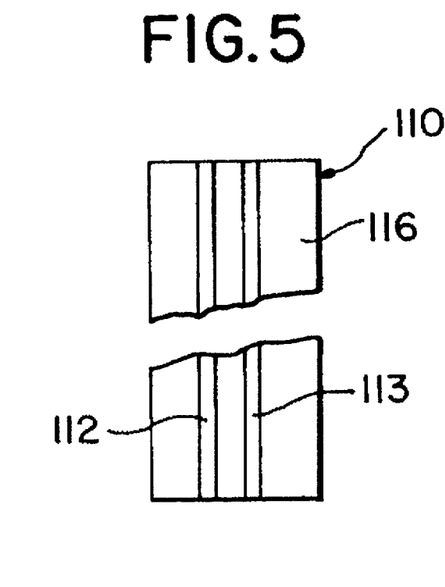
FIG. 5 is a glass preform used in one method of manufacture.
Figure 6:
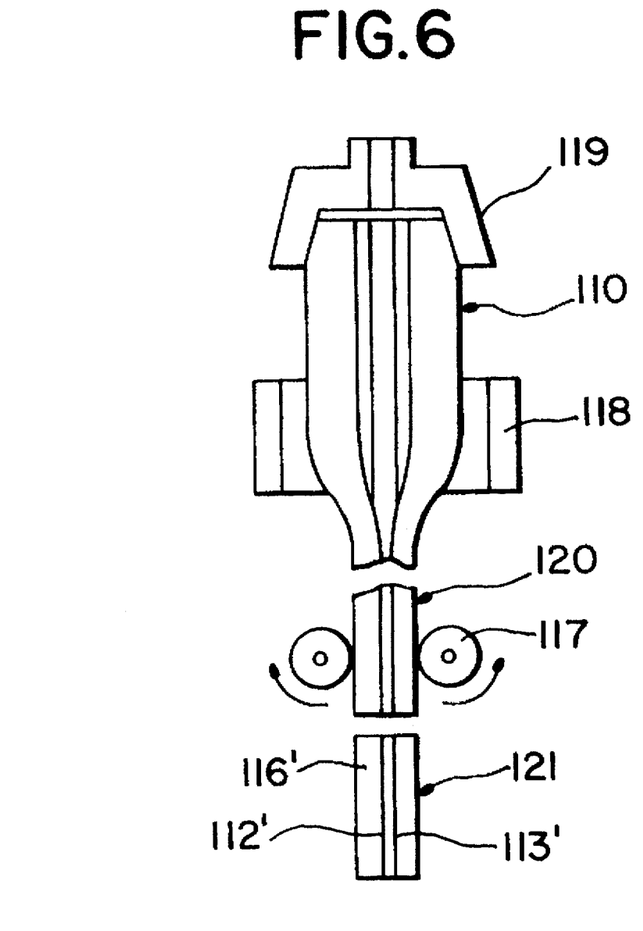
FIG. 6 is a schematic illustration of the stretching of this preform of FIG. 5.

The coupler 10 is made by one or more suitable processes as described in U.S. Pat. No. 4,799,949, assigned to Corning, Inc. As shown in FIG. 5 a coupler preform 110 comprises a plurality of parallel cores 112 and 113 and disposed in a boule 116 of matrix glass. Preform 110 is drawn or stretched by tractors 117 in furnace 118 (FIG. 6) to form multicore coupler rod 120. Rod 120 is sliced into numerous units 121 of suitable length. Vacuum fixture 119 may be attached to the top of preform 110 during stretching.

Figure 7:
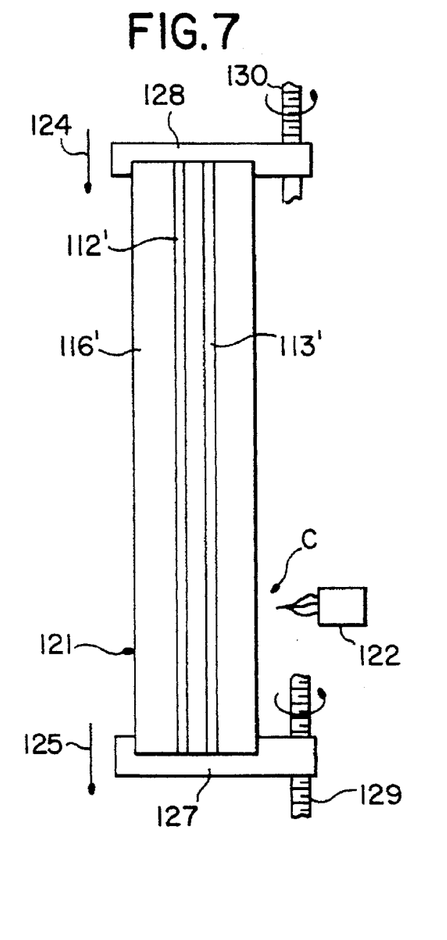
FIGS. 7 and 8 schematically illustrate heating and stretching of a severed unit to a tapered control section.
Figure 8:
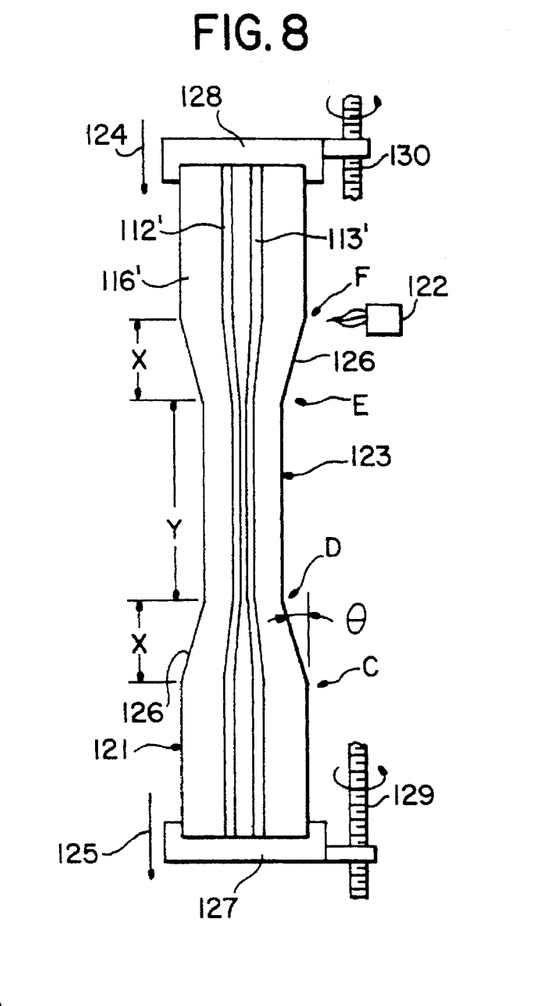

Referring to FIG. 7, each unit 121 comprises cores 112' and 113' within boule 116' of matrix glass. The central region of unit 121 is subjected to a controlled thermal environment by source 122 while it is stretched to form elongated or necked-down central region 123 of reduced diameter as shown in FIG. 8. Heat source 122, which is capable of providing a heated zone along a narrow axial region of the unit, can be a flame, laser or the like.

Figure 9:
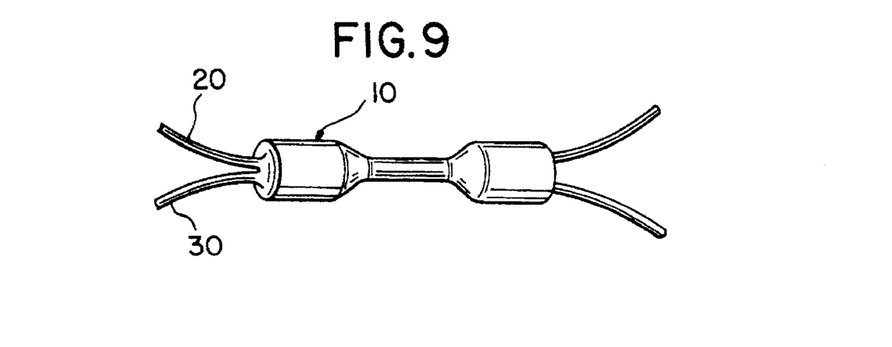
FIG. 9 is a perspective view of a coupler.

Necked-down region 123, including coupling region 12, is formed by relative movement between source 122 and unit 121 while controlled tension is applied to the unit by pulling one end thereof relative to the other. These conditions are fulfilled as follows. For purposes of the present description, heat source 122 is a ring burner capable of surrounding and directing heat radiation inwardly toward unit 121. After the unit is inserted through the ring burner, the ends thereof are clamped to stages 127 and 128. Stages 127 and 128 are vertically movable by rotating threaded shafts 129 and 130, respectively, which extend through threaded bores in those shafts. Shafts 129 and 130 are connected to motors (not shown) whose speed is programmed to vary with respect to time. Burner 122 is ignited and initially directs a ring of flame inwardly toward unit 121 at point C. Stage 128 begins to move down (arrow 124) at a constant velocity, and stage 127 begins to move down (arrow 125) at a slightly greater velocity. The faster rate of movement of stage 127 causes unit 121 to become elongated as it moves down through the stationary ring burner 122. The velocity of stage 127 increases in a linear manner as the relative position of burner 122 moves from point C to point D on unit 121. The velocity of stage 127 decreases in a linear manner until the relative position of the burner is adjacent to point E. At this time the flame is extinguished, and both stages stop moving. During the neck down phase the respective diameters of the cores 24 and 34 (44 and 54) and the claddings 22 and 32 (42 and 52) are reduced. The internal core 24 and 34 (44 and 54) virtually vanish and the claddings are the remaining significant portions of the original fibers 20 and 30 (40 and 50) in the necked down, (coupling) region 123 (12). The unit 121 is further processed in accordance with known techniques to provide the coupler 10 shown in FIG. 9.

The device 10 formed by the method shown in FIGS. 7 and 8 functions as an optical waveguide coupler. Light propagating in one core couples to the other core in necked down (coupling) region 12 where the cores 24, 34 are brought closer together and have reduced diameters. Away from coupling region 12, light does not couple from one core to the other since the cores are separated by a distance greater than the coupling distance. The diameter of the fibers 20, 30 in the non-necked down region is determined by the size of the fiber to be connected to ports 21, 31, 25, 35. The cores must be reduced in diameter by some minimum amount in the coupling region 12 in order to obtain effective coupling.

A coupler 10 may also be formed by the method shown in FIGS. 10–14 and as or particularly described in U.S. Pat. No. 5,011,251, assigned to Corning, Inc. and incorporated herein by reference. Coated fibers 917 and 918 comprise 125 μm diameter single-mode optical fibers 919 and 920 having 250 μm diameter urethan acrylic coatings 921 and 922 respectively. Both fibers have an 8 μm diameter core of silica doped with 8.5 percent $GeO_2$. One fiber had its intercladding further doped with $GeO_2$ in order to tune the coupler 10.

Figure 10:
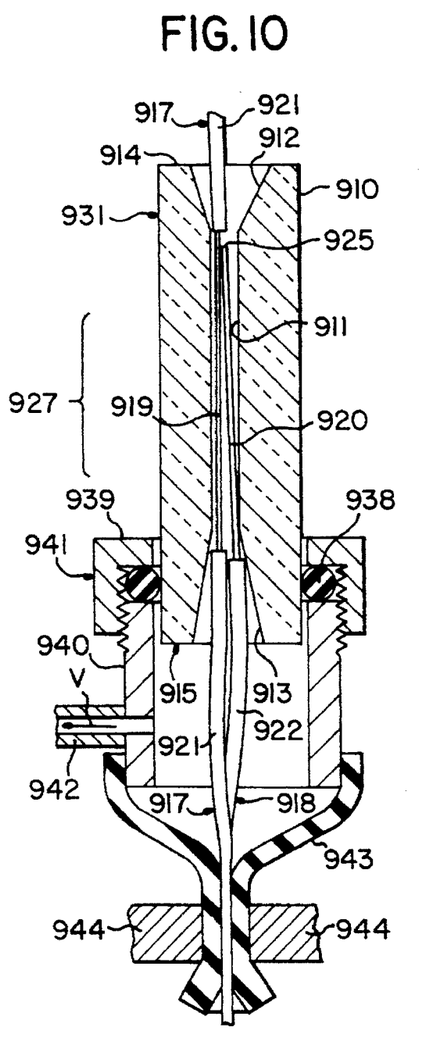
FIG. 10 is a cross-section view of a capillary tube with optical fibers inserted therein.

The fibers 917 and 918 are inserted into a glass capillary tube 910 having a 3.8 cm length, 2.8 mm outside diameter, and 270 μm longitudinal aperture diameter. The glass capillary tube 910 is a preform for the coupler 10. Preform 910 is made by a flame hydrolysis process and consists of silica doped with 6 percent by weight $B_2O_3$ and about 1 wt. percent fluorine. Tapered aperture 912 and 913 at opposite ends are formed by flowing the gas phase etchant $NF_3$ through the tube while uniformly heating the end of the tube 910.

Figure 11:
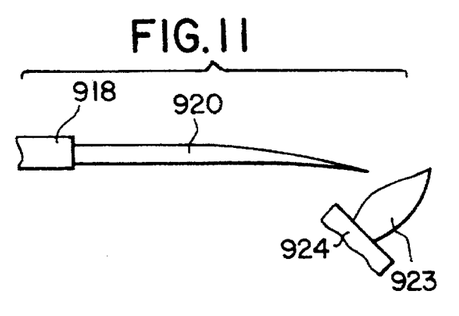
FIGS. 11 and 12 are schematic illustrations of steps for shaping fiber ends.
Figure 12:
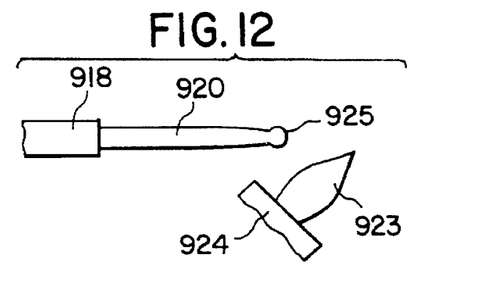

A 6 cm long section of coating was removed from the end of 1.5 meter length of coated fiber 918. A flame was directed at the center of the stripped region of fiber, and the end of the fiber was pulled and severed to form a tapered end (FIG. 11). The fiber end remote from the tapered end was connected to a reflectance monitoring apparatus. The tapered end was moved slowly along its longitudinal axis to the right (as shown in FIGS. 11 and 12 wherein only the bright, central portion 923 of the flame is illustrated). As the tip of fiber 920 was heated by flame 923 of burner 924', the glass receded and formed round endface 925 (FIG. 12), the diameter of which was preferably equal to or slightly smaller than the original uncoated fiber diameter. A current specification for the reflected power is −50 dB. The resultant length of uncoated fiber was about 2.9 cm.

Figure 13:
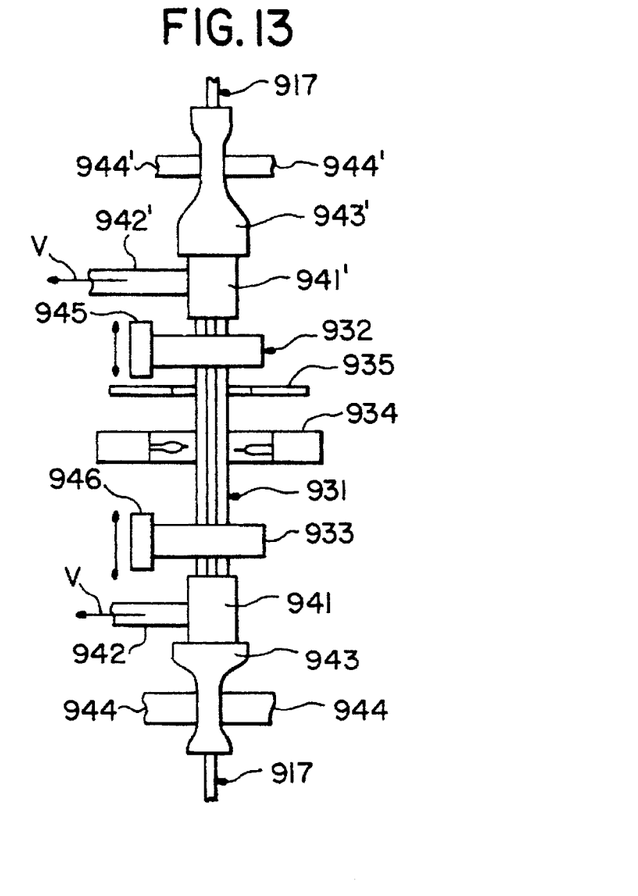
FIG. 13 is a schematic illustration of an apparatus for collapsing and stretching a preform.

With reference to FIG. 13, tube 910 is inserted through ring burner 934. The opposite ends of tube 910 are clamped to draw chucks 932 and 933. The chucks are mounted on motor controlled stages 945 and 946 which are controlled by a computer. Approximately 3.2 cm of coating is stripped from the central region of a 3 meter length of fiber 917. The uncoated sections of fibers 917 and 918 are wiped and a small amount of ethal alcohol is squirted into tube 910 to temporally lubricate the fibers 917 and 918 during insertion.

Coated fiber 917 is inserted through aperture 911 until its uncoated portion is situated below tube end 915. The uncoated portion of coated fiber 918 is held adjacent to the uncoated portion of coated fiber 917 and both are moved together towards tube end 914 until the coating end regions became wedged in tapered aperture 913. The uncoated portion of coated fiber 917 is then disposed between end surfaces 914 and 915. The uncoated portion of coated fiber 917 is preferably centered within aperture 911. End 925 of fiber 918 is located between mid-regions 927 and the end of 914 of tube 910. The fibers are threaded through the vacuum attachments 941 and 940, which are then attached to the ends of preform 910. Vacuum is applied to the upper and lower portions of preform 910 by clamping jaws 944 and 944'. The upper end of fiber 917 is connected to a monochromator coupled to a white light source. The monochromator is adjusted to provide a beam of 1310 nm light. The lower end of fiber 917 is connected to a detector which forms part of the system that controls the movement of chuck 932 and 933.

A vacuum of 10 inches (25.4 cm) of mercury is connected to the tube aperture and ring burner 934 is ignited. The portion of the apparatus above ring burner 934 is protected by a heat shield 935. Flames of about 1800° C. are generated by supplying gas oxygen to the burner at rates of 0.8 slpm and 0.85 slpm, respectively. The flame from ring burner 934 heats preform 910 for about 25 seconds. The matrix glass collapses onto fibers 919 and 920 as shown in FIG. 13. Mid-region 927 the central portion of which forms a coupling region of the coupler 10, becomes a solid region wherein substantially the entire length of fibers 919 and 920 are in mutual contact.

After the preform 910 cools, the flow rates of both the gas and oxygen are increased to 0.9 slpm and the burner is relit. Flames having a temperature of about 1900° C. heat the center of the collapsed region to its softening point. After 12 seconds, the supply of oxygen to burner 934 is turned off. Stages 945 and 946 pull in opposite directions at a combined rate of 2.5 cm/scc until the central portion of mid-region 927 is stretched 1.46 cm. After stretching, the flame is extinguished. The length increases just short of the length to which coupler preform 910 would had to be stretched in order to achieve achromaticity in a single stretching operation. Enough power was coupled to the fiber 918 to enable the end of that fiber to be connected to a detector, and the power output of the detector was peaked.

Flow rates of gas and oxygen to burner 934 were adjusted to 0.65 slpm and 0.6 slpm, respectively to produce a broader flame having a temperature of about 1650° C. Twelve seconds after the flame was ignited, the oxygen flow was turned off, and stages 945 and 946 pulled in opposite directions at a combined rate of 0.5 cm/scc to further increase the length of coupler preform 910 by about 0.02 cm. During this step, light emanating from fibers 917 and 918 was monitored at 1310 nm. The stretching operation automatically stopped when the ratio of the optical power from fiber 917 to that of fiber 918 was 1.2. The system momentum continues stretching to provide a power ratio of 1 whereby equal light power emanates from fibers 917 and 918 at 1310 nm. The diameter of the mid-region 927 is reduced by the stretching operation as illustrated by region 951 in FIG. 14.

Figure 14:
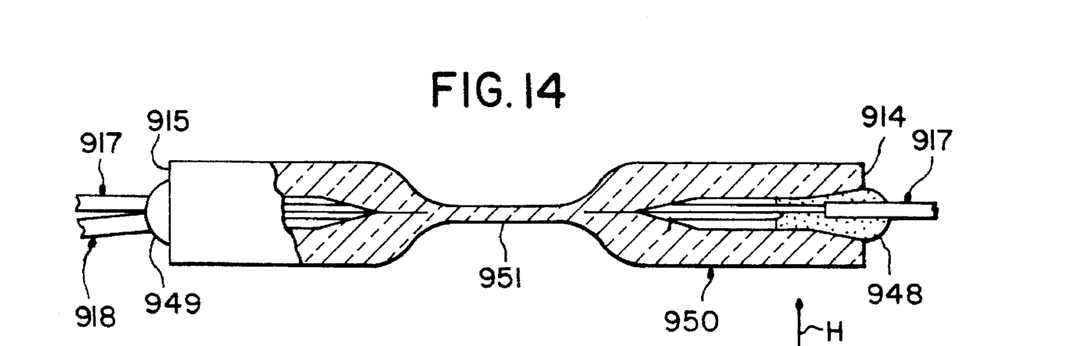
FIG. 14 is an illustration of a coupler made with the apparatus of FIG. 13.

After the coupler 10 had cools, the vacuum lines are removed from the resultant coupler, and drops 948 and 949 of heat curable adhesive are applied from a syringe to ends 914 and 915 respectively, of the capillary tube. After the adhesive was cured by exposure to heat (arrow H), the coupler 10 is removed from the draw.

The germanna clad fibers for this invention are more fully described in co-pending U.S. Ser. No. 60/006,217 (docket number 15725/8350), the entire disclosure of which is herein is incorporated by reference. In addition to germania, other photosensitive glasses may be used as a cladding for one of the fibers. Such other photosensitive glasses include but are not limited to $Ce^{3+}$, $Eu^{2+}$, $Eu^{3+}$, $TiO_2$, and $Pr^{3+}$. Those skilled in the art will appreciate that the amount of germania selected for the cladding is only a relative fraction of the amount of germania that is normally used in the core in order to turn or reflect light. The amount of germania used in the cladding is enough so that it has little or no appreciable effect upon altering the index of refraction in the coupler until the germania is illuminated with ultraviolet radiation. So, the germania may range between 0.01 to 50 percent by weight.

The coupler may comprise two or more fibers having cores doped with germania and altered by exposure to ultraviolet radiation. So, the invention broadly covers couplers with germania exposed to ultraviolet light to alter the index of refraction of at least one optical fiber in the coupler. In particular, the germania that is exposed to ultraviolet light may be in the clad, the core, or both.

Having thus disclosed the preferred embodiments of the invention, those skilled in the art will appreciate that further modifications, additions, and changes may be made to the invention without departing from the spirit and the scope of the invention as set forth in the following claims.

We claim:

1. A wavelength tunable optical waveguide coupler comprising:

at least two optical fibers, each optical fiber having a core and a cladding, the two optical fibers proximate to each other for a selected distance so that light of at least one coupling wave length in one fiber is coupled into the other fiber; and at least a portion of the cladding of one optical fiber doped with a sufficient amount of photosensitive glass and exposed to a sufficient amount of activating radiation for changing the index of refraction through said cladding of said one fiber and tuning the coupler to the coupling wavelength of light.

2. The wavelength tunable optical coupler of claim 1 wherein at least a portion of the core of said one optical fiber is doped with photosensitive glass.

3. The wavelength tunable optical coupler of claim 1 wherein the photosensitive glass is one selected from the group consisting of $GeO_2$, $Ce^{3+}$, $Eu^{2+}$, $Eu^{3+}$, $TiO_2$, and $Pr^{3+}$.

4. A wavelength tunable optical waveguide coupler comprising:

at least two optical fibers, each optical fiber having a core and a cladding, the two optical fibers proximate to each other for a selected distance so that light of at least one coupling wave length in one fiber is coupled into the other fiber; and at least a portion of the cladding of one optical fiber doped with a sufficient amount of photosensitive glass for changing the index of refraction through said cladding of said one fiber and tuning the coupler to the coupling wavelength of light when said photosensitive glass is exposed to activating radiation.

5. The wavelength tunable optical waveguide coupler of claim 4 wherein the photosensitive glass comprises germania.

6. The wavelength tunable optical waveguide coupler of claim 5 wherein the germania in the cladding of said one optical fiber comprises 0.01 to 50% by weight.

7. The wavelength tunable optical waveguide coupler of claim 4 wherein the coupler has two inputs and two outputs.

8. The wavelength tunable optical waveguide of claim 4 coupler wherein the photosensitive glass is one selected from the group consisting of $Ce^{3+}$, $Eu^{2+}$, $Eu^{3+}$, $TiO_2$, and $Pr^{3+}$.

9. A wavelength tunable optical waveguide coupler comprising:

a first optical fiber with a first core and a first cladding;

a second optical fiber with a second core and a second cladding;

a coupling region where the claddings of the two cores are adjoin each other for a coupling length chosen in accordance with a selected wavelength of light to be coupled from one optical fiber to the other optical fiber;

wherein at least one of the claddings has a sufficient amount of germania for altering the index of refraction of the coupler and tuning the output of the coupler to the coupling wavelength when the coupling region is exposed to ultraviolet radiation.

10. A process for tuning a an optical coupler to a selected wavelength comprising:

providing a coupler having at least two optical fibers proximate each other in coupling region that has a length selected in accordance with the coupling wavelength and wherein one optical fiber has its cladding doped with a photosensitive glass;

exposing the optical fiber with the doped cladding to radiation sufficient to alter the index of refraction of the cladding and thereby tune the coupler to the selected wavelength.

* * * * *

UNITED STATES PATENT AND TRADEMARK OFFICE
CERTIFICATE OF CORRECTION

PATENT NO. : 5,647,040
DATED : July 8, 1997
INVENTOR(S) : Thomas A. Cook, Robert A. Modavis It is certified that error appears in the above-indentified patent and that said Letters Patent is hereby corrected as shown below:

Col. 5, Line 50, "outpat" should be "output"

Col. 6, LIne 5, "germanna" should be "germania"

Col. 7, Line 4, "opticai" should be "optical"

Signed and Sealed this

Sixth Day of January, 1998

Attest:

BRUCE LEHMAN

Attesting Officer

Commissioner of Patents and Trademarks